United States Patent
Fang (10) Patent No.: US 10,649,593 B2
(45) Date of Patent: May 12, 2020

(54) HAND HOLDING STATE DETECTION METHOD, CAPACITIVE TOUCH APPARATUS AND ELECTRONIC DEVICE

(71) Applicant: SHENZHEN GOODIX TECHNOLOGY CO., LTD., Shenzhen (CN)

(72) Inventor: Jun Fang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 218 days.

(21) Appl. No.: 15/801,274

(22) Filed: Nov. 1, 2017

(65) Prior Publication Data

US 2018/0120976 A1    May 3, 2018

Related U.S. Application Data

(63) Continuation of application No. PCT/CN2016/104001, filed on Oct. 31, 2016.

(51) Int. Cl.
*G06F 3/041* (2006.01)
*G06F 3/044* (2006.01)
(Continued)

(52) U.S. Cl.
CPC ............ *G06F 3/044* (2013.01); *G06F 3/0416* (2013.01); *G06F 3/0487* (2013.01); *G06F 3/04886* (2013.01)

(58) Field of Classification Search
CPC ...... G06F 3/0418; G06F 1/3203; G06F 3/044; G06F 1/1626; G06F 3/0416; G06F 3/165; G06F 3/041; G06F 3/048
See application file for complete search history.

(56) References Cited

U.S. PATENT DOCUMENTS

2006/0197750 A1*   9/2006   Kerr ................... G06F 1/1626
                                                   345/173
2008/0165138 A1*   7/2008   Li ........................ G06F 3/044
                                                   345/173
(Continued)

FOREIGN PATENT DOCUMENTS

CN            105474131 A         4/2016
CN            105824549 A         8/2016
(Continued)

*Primary Examiner* — Jennifer Mehmood
*Assistant Examiner* — James S Nokham (57) ABSTRACT

Embodiments of the present disclosure provide a hand holding state detection method, a capacitive touch apparatus and an electronic device. The method includes: acquiring feature data output by each coupling capacitor in a capacitor array network when the coupling capacitor is touched, and reference feature data corresponding to each coupling capacitor; and determining a feature region formed by touch on the capacitor array according to the feature data output by each coupling capacitor and the corresponding reference feature data, to determine a hand holding state according to the feature region. In this way, a man-machine interaction interface may be adjusted according to the hand holding state, such that a user may conveniently or accurately touch all the virtual keys in the man-machine interaction interface.

9 Claims, 9 Drawing Sheets

(51) Int. Cl.
  *G06F 3/0487* (2013.01)
  *G06F 3/033* (2013.01)
  *G06F 3/048* (2013.01)
  *G06F 3/038* (2013.01)
  G06F 3/0488 (2013.01)

(56) References Cited

U.S. PATENT DOCUMENTS

| | | | | |
|---|---|---|---|---|
| 2010/0085317 A1* | 4/2010 | Park | ............ | G06F 1/1626 |
| | | | | 345/173 |
| 2010/0117961 A1* | 5/2010 | Westerman | ......... | G06F 3/03543 |
| | | | | 345/163 |
| 2010/0253644 A1* | 10/2010 | Lee | ............ | G06F 1/3203 |
| | | | | 345/173 |
| 2012/0062488 A1* | 3/2012 | Lin | ............ | G06F 3/0418 |
| | | | | 345/173 |
| 2012/0262407 A1* | 10/2012 | Hinckley | ............ | G06F 3/038 |
| | | | | 345/173 |
| 2013/0215060 A1* | 8/2013 | Nakamura | ............ | G06F 1/1626 |
| | | | | 345/173 |
| 2014/0091817 A1* | 4/2014 | Besshi | ............ | G06F 3/0418 |
| | | | | 324/684 |
| 2016/0195986 A1* | 7/2016 | Kwon | ............ | G06F 3/044 |
| | | | | 345/174 |
| 2016/0283053 A1 | 9/2016 | Shi | | |

FOREIGN PATENT DOCUMENTS

| | | |
|---|---|---|
| CN | 105867787 A | 8/2016 |
| EP | 3035154 A1 | 4/2016 |
| KR | 10-20150019352 A | 2/2015 |

* cited by examiner

| | | | | | | | | | | | | | | |
|---|---|---|---|---|---|---|---|---|---|---|---|---|---|---|
| 1 | 2 | 0 | 1 | 2 | -1 | 1 | 2 | -2 | 1 | -3 | -1 | -1 | -1 | 2 | 1 |
| 3 | 1 | 1 | 0 | 2 | 0 | 0 | 0 | 0 | -1 | -1 | -1 | 0 | -1 | 1 | -1 |
| 2 | -1 | -1 | 1 | -2 | 0 | 0 | 1 | 0 | 0 | 1 | 0 | 0 | 1 | -1 | 0 |
| 3 | 1 | -1 | 1 | 0 | -2 | -1 | 1 | -1 | 0 | -1 | 0 | 1 | 1 | 1 | 0 |
| 1 | 0 | 0 | 1 | 1 | 0 | 1 | 1 | -1 | 1 | 0 | -2 | 1 | -1 | 0 | 1 |
| -1 | 0 | 2 | -1 | -2 | -2 | -1 | 2 | 1 | 0 | -1 | -1 | -2 | -3 | 0 | 0 |
| 0 | -3 | 0 | -1 | 1 | 1 | 0 | 0 | -1 | 1 | -2 | -1 | 0 | 2 | -3 | 1 |
| 1 | 2 | 0 | 2 | -1 | -1 | 0 | 0 | -2 | -1 | -1 | -3 | 0 | -1 | 2 | 43 |
| -2 | -1 | -2 | -1 | 1 | -3 | 0 | -1 | 0 | 1 | -1 | -1 | 1 | -1 | -1 | 109 |
| 2 | -2 | 0 | -2 | 0 | 0 | 0 | -2 | 1 | -1 | 1 | -2 | -1 | -1 | -2 | 33 |
| 53 | -1 | -1 | -1 | 0 | -2 | 0 | 1 | -1 | 1 | -1 | 0 | -2 | 0 | -1 | 1 |
| 93 | -1 | 0 | -2 | 0 | -1 | 0 | 1 | 0 | -1 | -2 | -1 | -1 | 0 | -1 | 113 |
| 53 | 0 | 0 | 0 | 0 | -2 | -2 | -2 | -2 | 1 | 1 | -3 | 0 | 0 | 0 | 167 |
| 176 | 97 | 0 | -2 | 0 | 0 | -1 | 1 | 1 | -2 | 0 | -2 | -2 | 1 | -1 | 74 |
| 172 | 224 | 47 | 1 | 1 | 0 | 1 | 1 | 0 | 1 | 1 | 2 | 2 | -2 | 2 | 1 |
| 146 | 223 | 160 | 0 | 1 | 1 | 1 | 3 | 2 | 0 | 0 | 1 | 1 | 2 | 0 | 0 |
| 124 | 215 | 184 | -3 | 1 | 0 | -1 | 0 | 0 | 0 | 1 | -1 | -1 | 0 | -1 | 61 |
| 123 | 215 | 136 | 2 | 1 | 0 | 1 | 1 | 0 | -1 | 0 | 2 | 1 | 1 | 3 | 148 |
| 145 | 212 | 45 | 0 | 0 | 0 | 1 | -1 | 0 | -1 | 0 | 0 | -1 | -1 | -1 | 152 |
| 186 | 137 | 6 | 0 | 0 | -1 | -1 | 1 | 0 | 0 | 0 | -1 | 0 | -1 | -1 | 46 |
| 192 | 58 | -1 | -1 | 0 | 0 | -1 | -3 | -1 | 0 | -1 | 0 | 1 | 1 | -2 | 0 |
| 157 | 0 | 0 | -1 | 0 | -2 | -1 | 0 | 0 | 0 | 1 | -2 | -3 | 2 | 0 | 0 |
| 11 | -1 | -1 | -1 | 0 | 0 | 0 | 0 | 0 | 1 | 2 | 0 | 1 | -1 | 0 |
| 0 | 2 | -1 | 0 | 1 | 0 | 1 | 2 | -2 | 0 | -2 | 0 | 0 | -1 | 2 | 0 |
| 3 | 1 | 2 | 0 | 1 | 1 | 0 | 1 | -1 | -1 | -1 | -3 | 1 | -1 | 1 | -1 |
| 2 | 1 | 0 | 1 | -2 | 0 | 0 | 0 | 0 | -1 | 0 | 0 | 1 | 2 | 1 | -1 |
| 2 | 2 | -1 | 2 | 0 | -1 | -1 | 0 | -1 | 0 | 0 | 0 | -1 | 1 | 2 | 0 |
| 1 | 1 | -1 | 1 | 1 | 0 | 2 | 0 | -1 | 0 | 1 | -1 | 1 | 0 | 1 | 0 |

| | | | | | | | | | | | | | | |
|---|---|---|---|---|---|---|---|---|---|---|---|---|---|---|
| 1 | 2 | 0 | 1 | 2 | -1 | 1 | 2 | -2 | 1 | -3 | -1 | -1 | -1 | 2 | 1 |
| 3 | 1 | 1 | 0 | 2 | 0 | 0 | 0 | 0 | -1 | -1 | -1 | 0 | -1 | 1 | -1 |
| 2 | -1 | -1 | 1 | -2 | 0 | 0 | 1 | 0 | 0 | 1 | 0 | 0 | 1 | -1 | 0 |
| 3 | 1 | -1 | 1 | 0 | -2 | -1 | 1 | -1 | 0 | -1 | 0 | 1 | 1 | 1 | 0 |
| 1 | 0 | 0 | 1 | 1 | 0 | 1 | 1 | -1 | 1 | 0 | -2 | 1 | -1 | 0 | 1 |
| -1 | 0 | 2 | -1 | -2 | -2 | -1 | 2 | 1 | 0 | -1 | -1 | -2 | -3 | 0 | 0 |
| 0 | -3 | 0 | -1 | 1 | 1 | 0 | 0 | -1 | 1 | -2 | -1 | 0 | 2 | -3 | 1 |
| 1 | 2 | 0 | 3 | -1 | -1 | 0 | 0 | -2 | -1 | -1 | -3 | 0 | -1 | 2 | -1 |
| -2 | -1 | -2 | -1 | 1 | -3 | 0 | -1 | 0 | 1 | -1 | -1 | 1 | -1 | -1 | 1 |
| 2 | -3 | 0 | -2 | 0 | 0 | 0 | -2 | 1 | -1 | 1 | -2 | -1 | -1 | -2 | 50 |
| 1 | -1 | -1 | -1 | 0 | -2 | 0 | 1 | -1 | 1 | -1 | 0 | -2 | 0 | -1 | 81 |
| 103 | -1 | 0 | -2 | 0 | -1 | 0 | 1 | 0 | -1 | -2 | -1 | -1 | 0 | 3 | 192 |
| 151 | 0 | 0 | 0 | 0 | -2 | -3 | -2 | -2 | 1 | 1 | -3 | 0 | 12 | 143 | 216 |
| 104 | -1 | 0 | -2 | 0 | 0 | -1 | 1 | 1 | -3 | 0 | -2 | -2 | 28 | 151 | 199 |
| 5 | 2 | 1 | 1 | 1 | 0 | 1 | 1 | 0 | 1 | 1 | 2 | 2 | 41 | 177 | 211 |
| 55 | 0 | 0 | 0 | 1 | 1 | 1 | 3 | 2 | 0 | 0 | 1 | 1 | 30 | 192 | 206 |
| 143 | -1 | -1 | -3 | 1 | 0 | -1 | 0 | 0 | 0 | 1 | -1 | -1 | 26 | 188 | 217 |
| 167 | 3 | -1 | 2 | 1 | 0 | 1 | 1 | 0 | -1 | 0 | 2 | 1 | 23 | 160 | 226 |
| 51 | -1 | -1 | 0 | 0 | 0 | 1 | -1 | 0 | -1 | 0 | 0 | -1 | 0 | 120 | 233 |
| 0 | -1 | -1 | 0 | 0 | -1 | -1 | 1 | 0 | 0 | 0 | -1 | 0 | -1 | 57 | 214 |
| -1 | -2 | -1 | -1 | 0 | 0 | -1 | -3 | -1 | 0 | -1 | 0 | 1 | 1 | 3 | 33 |
| 50 | 0 | 0 | -1 | 0 | -2 | -1 | 0 | 0 | 0 | 1 | -2 | -3 | 2 | 0 | 42 |
| 109 | -1 | -1 | -1 | 0 | 0 | 0 | 0 | 0 | 1 | 2 | 0 | 1 | -1 | 0 |
| 111 | 2 | -1 | 0 | 1 | 0 | 1 | 2 | -2 | 0 | -2 | 0 | 0 | -1 | 2 | 0 |
| 3 | 1 | 2 | 0 | 1 | 1 | 0 | 1 | -1 | -1 | -1 | -3 | 1 | -1 | 1 | -1 |
| 2 | 1 | 0 | 1 | -2 | 0 | 0 | 0 | 0 | -1 | 0 | 0 | 1 | 2 | 1 | -1 |
| 2 | 2 | -1 | 2 | 0 | -1 | -1 | 0 | -1 | 0 | 0 | 0 | -1 | 1 | 2 | 0 |
| 1 | 1 | -1 | 1 | 1 | 0 | 2 | 0 | -1 | 0 | 1 | -1 | 1 | 0 | 1 | 0 |

HAND HOLDING STATE DETECTION METHOD, CAPACITIVE TOUCH APPARATUS AND ELECTRONIC DEVICE

CROSS REFERENCE TO RELATED APPLICATIONS

The present application is a continuation of international application No. PCT/CN2016/104001 filed on Oct. 31, 2016, which is hereby incorporated by reference in its entirety.

TECHNICAL FIELD

Embodiments of the present disclosure relate to the field of touch technologies, and in particular, relate to a hand holding state detection method, a capacitive touch apparatus and an electronic device.

BACKGROUND

The touch technology, when applied to a smart terminal, enables a user to operate the terminal by means of gesture operations. As such, a traditional mechanical keyboard is not needed, such that man-machine interaction is simpler and more direct. The touch technology may be categorized based on the induction principle into: resistive touch technology, capacitive touch technology, surface acoustic wave touch technology, and optics touch technology. At present, the capacitive touch technology is most commonly used on the smart terminals.

A capacity touch panel (CTP) operates based on current induction of a human body. When a user touches the CTP, due to the electric field of the human body, a finger of the user forms a coupling capacitor with a working surface, and a series of touch operation functions are implemented by detecting the capacitance value of the coupling capacitor.

The capacitive touch technology may also be categorized into surface capacitive touch technology and projective capacitive touch technology. At present, the projective capacitive touch technology is more widely used by the smart terminal manufacturers. In the projective capacitive touch technology, upper and lower electrodes are refined to a matrix distribution, and are cross-distributed along the X axis and Y axis to form a capacitor matrix. When the finger touches the electrodes, capacitance variations at the touch position may be detected by scanning the X and Y axes, such that the touch position of the finger is calculated, and hence a series touch operation functions can be implemented.

However, during use of the smart terminal, the user generally holds the smart terminal using a single hand, and operates the smart terminal using the single hand. As such, with the increase of the screen size of the smart terminal, during operations with a single hand, it is hard for the user to conveniently or accurately touch some virtual keys because the area of the screen is very large.

Therefore, it is urgent to provide a hand holding state detection solution, to determine a hand holding state of holding the terminal and thus adjust the man-machine interaction interface, such that the user may conveniently or accurately touch all the virtual keys in the man-machine interaction interface.

SUMMARY

Embodiments of the present disclosure are intended to provide a hand holding state detection method, a capacitive touch apparatus and an electronic device, to at least solve the above problem in the related art.

To achieve the objectives of embodiments of the present disclosure, embodiments of the present disclosure provide a hand holding state detection method. The method includes:

acquiring feature data output by each coupling capacitor in a capacitor array network when the coupling capacitor is touched, and reference feature data corresponding to each coupling capacitor; and determining a feature region formed by touch on the capacitor array according to the feature data output by each coupling capacitor and the corresponding reference feature data, to determine a hand holding state according to the feature region.

To achieve the objectives of embodiments of the present disclosure, embodiments of the present disclosure further provide a capacitive touch apparatus. The apparatus includes: a processor and a capacitor array network; wherein the processor is configured to acquire feature data output by each coupling capacitor in a capacitor array network when the coupling capacitor is touched, and reference feature data corresponding to each coupling capacitor; and determine a feature region formed by touch on the capacitor array according to the feature data output by each coupling capacitor and the corresponding reference feature data, to determine a hand holding state according to the feature region.

To achieve the objectives of embodiments of the present disclosure, embodiments of the present disclosure further provide an electronic device. The electronic device includes the capacitive touch apparatus according to any embodiment.

In the embodiments of the present disclosure, feature data output by each coupling capacitor in a capacitor array network when the coupling capacitor is touched, and reference feature data corresponding to each coupling capacitor are acquired; and a feature region formed by touch on the capacitor array is determined according to the feature data output by each coupling capacitor and the corresponding reference feature data, to determine a hand holding state according to the feature region. In this way, a man-machine interaction interface may be adjusted according to the hand holding state, such that a user may conveniently or accurately touch all the virtual keys in the man-machine interaction interface.

DETAILED DESCRIPTION

Practice of the present application is described in detail with reference to drawings and specific embodiments, such that the practice of addressing the technical problem using the technical means according to the present application and achieving the technical effects may be better understood and conducted.

In the embodiments of the present disclosure, a processor and a capacitor array network are provided. The processor is configured to: acquire feature data output by each coupling capacitor in a capacitor array network when the coupling capacitor is touched, and reference feature data corresponding to each coupling capacitor; and determine a feature region formed by touch on the capacitor array according to the feature data output by each coupling capacitor and the corresponding reference feature data, to determine a hand holding state according to the feature region. In this way, a man-machine interaction interface may be adjusted according to the hand holding state, such that a user may conveniently or accurately touch all the virtual keys in the man-machine interaction interface.

Figure 1:
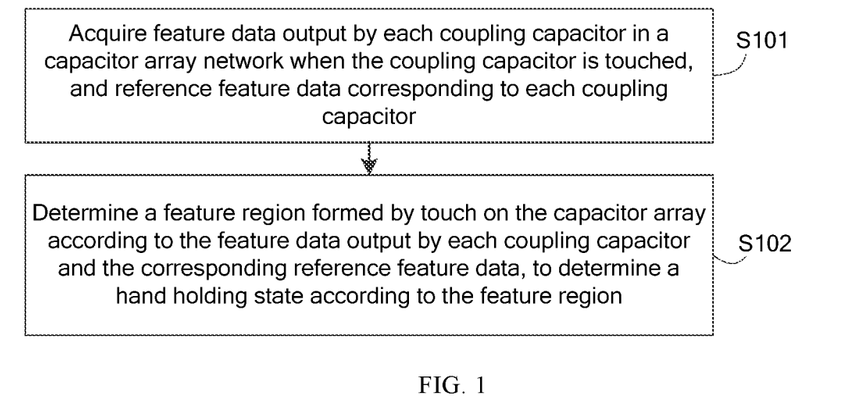
FIG. 1 is a schematic flowchart of a hand holding state detection method according to Embodiment 1 of the present disclosure.

FIG. 1 is a schematic flowchart of a hand holding state detection method according to Embodiment 1 of the present disclosure. As illustrated in FIG. 1, the method includes the following steps:

S101: Feature data output by each coupling capacitor in a capacitor array network when the coupling capacitor is touched, and reference feature data corresponding to each coupling capacitor are acquired.

Feature data output by each coupling capacitor in a capacitor array network of a sample device when the coupling capacitors are not touched by a finger is used as the reference feature data, and the reference feature data can be stored in various devices having a touch screen that applies the detection method. Specifically, the reference feature data may be stored before the device is delivered from the factory, and the data may also be detected by using a detection circuit and stored during use upon delivery from the factory. The reference feature data may be a voltage output or a capacitance of the coupling capacitor when the coupling capacitor is not touched, or may be data converted from the voltage output by the coupling capacitor or the capacitance of the coupling capacitor when the coupling capacitor is not touched, or may be any data that reflects a touch by the finger.

S102: A feature region formed by touch on the capacitor array is determined according to the feature data output by each coupling capacitor and the corresponding reference feature data, to determine a hand holding state according to the feature region.

In this embodiment, if the coupling capacitor is a mutual-capacitor, when a finger touches the coupling capacitor, the capacitance of the coupling capacitor becomes smaller and the voltage output by the coupling capacitor becomes greater relative to the case of no touch by a finger; and if the coupling capacitor is a self-capacitor, when the finger touches the coupling capacitor, the capacitance of the coupling capacitor becomes greater and the voltage output by the coupling capacitor becomes smaller.

In consideration of universality of the practical algorithm, the feature region is determined based on the same comparison principle, for example, the principle that the output data is greater than a specific value or less than a specific value.

Specifically, for example, with respect to a case where the coupling capacitor is a mutual-capacitor, if the feature data is an output voltage of the coupling capacitor and the reference feature data is a reference output voltage of the coupling capacitor, the voltage output by each coupling capacitor is compared with a corresponding reference output voltage; and if the output voltage is greater than the reference output voltage, the position of a corresponding coupling capacitor whose output voltage is greater than the reference output voltage is determined to determine the feature region. With respect to a case where the coupling capacitor is a self-capacitor, if the feature data is a capacitance and the reference feature data is a reference capacitance, a capacitance output by each coupling capacitor is compared with a corresponding reference capacitance; and if the output capacitance is greater than the corresponding reference capacitance, the position of a corresponding coupling capacitor whose output capacitance is greater than the reference capacitance is determined, thus to determine the feature region. In this embodiment, in step S102, the feature data output by each coupling capacitor is compared with the corresponding reference feature data; and if a value of the feature data is greater than a value of the corresponding reference feature data, positions of coupling capacitors whose feature data is greater than the corresponding reference feature data are determined to determine the feature region.

Alternatively, with respect to a case where the coupling capacitor is a mutual-capacitor, if the feature data is a capacitance and the reference feature data is a reference capacitance, a capacitance output by each coupling capacitor is compared with a corresponding reference capacitance; and if the output capacitance is less than the corresponding reference capacitance, the position of a corresponding coupling capacitor whose output capacitance is less than the reference capacitance is determined, thus to determine the feature region. With respect to a case where the coupling capacitor is a self-capacitor, if the feature data is an output voltage of the coupling capacitor and the reference feature data is a reference output voltage of the coupling capacitor, the voltage output by each coupling capacitor is compared with a corresponding reference output voltage; and if the output voltage is less than the reference output voltage, it is determined that the position of a corresponding coupling capacitor whose output voltage is less than the reference output voltage is determined to determine the feature region. In this embodiment, in step S102, the feature data output by each coupling capacitor is compared with the corresponding reference feature data; and if a value of the feature data is less than a value of the corresponding feature data, positions of coupling capacitors whose feature data is less than the corresponding reference feature data are determined to determine the feature region.

Alternatively, data in a specific form may be formed by processing the output voltage and the reference output voltage, and then the feature region may be determined according to the above principle that the output voltage is greater than or less than the reference voltage. Similarly, data in a specific form may also be formed by processing the output capacitance and the reference capacitance, and then the feature region may be determined according to the above principle that the output capacitance is greater than or less than the reference capacitance.

Figure 2:
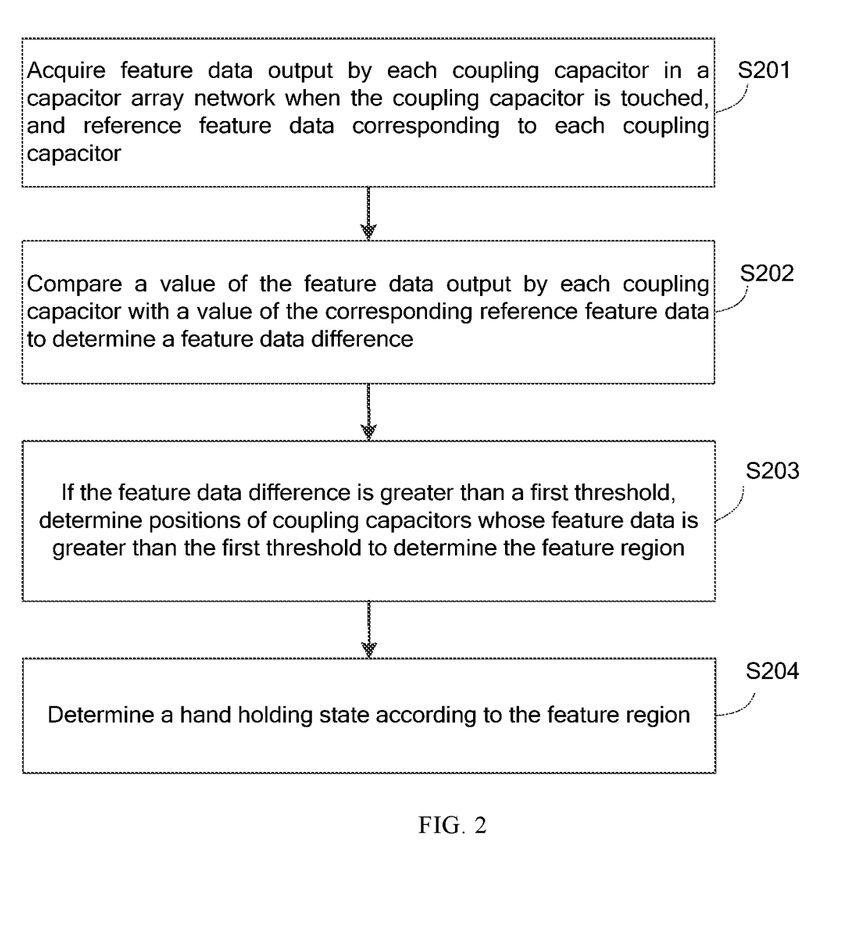
FIG. 2 is a schematic flowchart of a hand holding state detection method according to Embodiment 2 of the present disclosure.

FIG. 2 is a schematic flowchart of a hand holding state detection method according to Embodiment 2 of the present disclosure. As illustrated in FIG. 2, the method includes the following steps:

S201: Feature data output by each coupling capacitor in a capacitor array network when the coupling capacitor is touched, and reference feature data corresponding to each coupling capacitor are acquired.

In this embodiment, step S201 is similar to step S101 in the above embodiment, which is not described herein any further.

S202: A value of the feature data output by each coupling capacitor is compared with a value of the corresponding reference feature data to determine a feature data difference.

S203: If the feature data difference is greater than a first threshold, positions of coupling capacitors whose feature data is greater than the first threshold are determined to determine the feature region.

In this embodiment, regardless of whether the coupling capacitor is a mutual-capacitor or a self-capacitor, relative to the case of no touch by a finger, when the finger touches the coupling capacitor, a greater difference is present between feature data of the coupling capacitor at a finger touch position and corresponding reference feature data, that is, a greater feature data difference; and a smaller difference or no difference is present between feature data of the coupling capacitor outside the finger touch position and the reference feature data. Therefore, the feature region may be determined based on the greater feature data difference. The feature data difference may be a difference value obtained by absolute value processing.

In this embodiment, when the finger touches the coupling capacitor, sample feature data output by each coupling capacitor may be measured, and the sample feature data is compared with the corresponding reference feature data to obtain a sample feature data difference. The first threshold may be obtained by performing statistical collection for the sample feature data. When the feature region formed by touch on the capacitor array is determined according to the feature data output by each coupling capacitor and the reference feature data corresponding to each coupling capacitor, the feature data difference corresponding to each coupling capacitor may be compared with the first threshold; and if the feature data difference is greater than the first threshold, the position of a coupling capacitor whose feature data difference is greater than the first threshold is determined to determine the feature region.

S204: A hand holding state is determined according to the feature region.

Further, in this embodiment, the determining a hand holding state according to the feature region comprises: performing statistical counting for variation degree of the feature data output by different coupling capacitors whose feature data difference is greater than the first threshold in the feature region, and determining the hand holding state according to the variation degree. For example, statistical collection may be performed for the variation degree of the feature data according to variance or differential calculation. Using statistical collection of the variation degree of the feature data according to differential calculation as an example, a maximum of all the feature data is determined, difference between value of each other feature data and the maximum value is calculated, the absolute value of each difference is obtained, and then an average value of these absolute values is obtained. The obtained average value is compared with a second threshold, so as to determine the variation degree. If the average value is greater than the second threshold, it is considered that the variations are abrupt and a finger touch is present, and if the average value is less than a third threshold, it is considered that the variations are gentle and the palm touch is present. Herein, the second threshold may be obtained by reference to the method of obtaining the first threshold, which is not described herein any further.

TABLE 1

| Data of capacitances of mutual-capacitors in an N × M capacitor array | | | | | | | |
|---|---|---|---|---|---|---|---|
| A00 | A01 | A02 | A03 | . . . . . . | A0(M − 3) | A0(M − 2) | A0(M − 1) |
| A10 | A11 | A12 | A13 | . . . . . . | A1(M − 3) | A1(M − 2) | A1(M − 1) |
| A20 | A21 | A22 | A23 | . . . . . . | A2(M − 3) | A2(M − 2) | A2(M − 1) |
| . . . | . . . | . . . | . . . | . . . . . . . . . | . . . | . . . | . . . |
| A(N − 2)0 | A(N − 2)1 | A(N − 2)2 | A(N − 2)3 | . . . . . . | A(N − 2)(M − 3) | A(N − 2)(M − 2) | A(N − 2)(M − 1) |
| A(N − 1)0 | A(N − 1)1 | A(N − 1)2 | A(N − 1)3 | . . . . . . | A(N − 1)(M − 3) | A(N − 1)(M − 2) | A(N − 1)(M − 1) |

Referring to Table 1, using a case where there are N rows of driving detection channels and M columns of sensing detection channels, and thus N×M mutual-capacitors are formed as an example, N×M coupling capacitors as illustrated in Table 1 are formed at intersections between each driving detection channel and each column of sensing detection channels, and data of the capacitances of the corresponding coupling capacitors is respectively A00 . . . A(N−1)(M−1). These capacitances are used as the feature data corresponding to the coupling capacitors when the coupling capacitors are touched in the above embodiment.

TABLE 2

| Data of capacitances of self-capacitors in an N × M capacitor array | | | | | | | |
|---|---|---|---|---|---|---|---|
| CX0 | CX 1 | CX 2 | CX 3 | . . . | . . . CX (N − 3) | CX (N − 2) | CX (N − 1) |
| CY0 | CY 1 | CY 2 | CY 3 | . . . | . . . CY (M − 3) | CY (M − 2) | CY (M − 1) |

Referring to Table 2, there are N grounding capacitors in the X direction, and M channels and M grounding capacitors in the Y direction, and thus there are totally N+M coupling capacitors. Data of capacitance values of the N+M self-capacitors is CX0 . . . CX (N−1), CY0 . . . CY(M−1)

respectively. These capacitances are used as the feature data corresponding to the coupling capacitors when the coupling capacitors are touched.

TABLE 3

Data of capacitance differences of mutual-capacitors in an N × M capacitor array after the touch panel is touched

| D00 | D01 | D02 | D03 | ...... | D0(M − 3) | D0(M − 2) | D0(M − 1) |
|---|---|---|---|---|---|---|---|
| D10 | D11 | D12 | D13 | ...... | D1(M − 3) | D1(M − 2) | D1(M − 1) |
| D20 | D21 | D22 | D23 | ...... | D2(M − 3) | D2(M − 2) | D2(M − 1) |
| ... | ... | ... | ... | ...... | ... | ... | ... |
| D(N − 2)0 | D(N − 2)1 | D(N − 2)2 | D(N − 2)3 | ...... | D(N − 2)(M − 3) | D(N − 2)(M − 2) | D(N − 2)(M − 1) |
| D(N − 1)0 | D(N − 1)1 | D(N − 1)2 | D(N − 1)3 | ...... | D(N − 1)(M − 3) | D(N − 1)(M − 2) | D(N − 1)(M − 1) |

Referring to Table 3, corresponding to the case of mutual-capacitors as illustrated in Table 1, a difference between the mutual-capacitance of each mutual-capacitor after being touched and the reference mutual-capacitance of the mutual-capacitor before being touched or in case of no touch is calculated, and absolute values are obtained from the differences. Afterwards, data D00 ... D(N−1)(M−1) of capacitance differences of the N×M mutual-capacitors is obtained, and the data is used as the feature data difference of the corresponding coupling capacitors.

TABLE 4

Data of capacitance differences of self-capacitors in an N × M capacitor array

| EX0 | EX 1 | EX 2 | EX 3 | ... | ... EX (N − 3) | EX (N − 2) | EX (N − 1) |
|---|---|---|---|---|---|---|---|
| EY0 | EY 1 | EY 2 | EY 3 | ... | ... EY (M − 3) | EY (M − 2) | EY (M − 1) |

Referring to Table 4, corresponding to the case of self-capacitors as illustrated in Table 2, a difference between the self-capacitance of each self-capacitor after being touched and the reference self-capacitance of the self-capacitor before being touched or in case of no touch is calculated. Afterwards, data EX0 ... EX (N−1), EY0 ... EY(N−1) of capacitance differences of the N×M self-capacitors is obtained, and the data is used as the feature data difference of the corresponding coupling capacitors.

Figure 3:
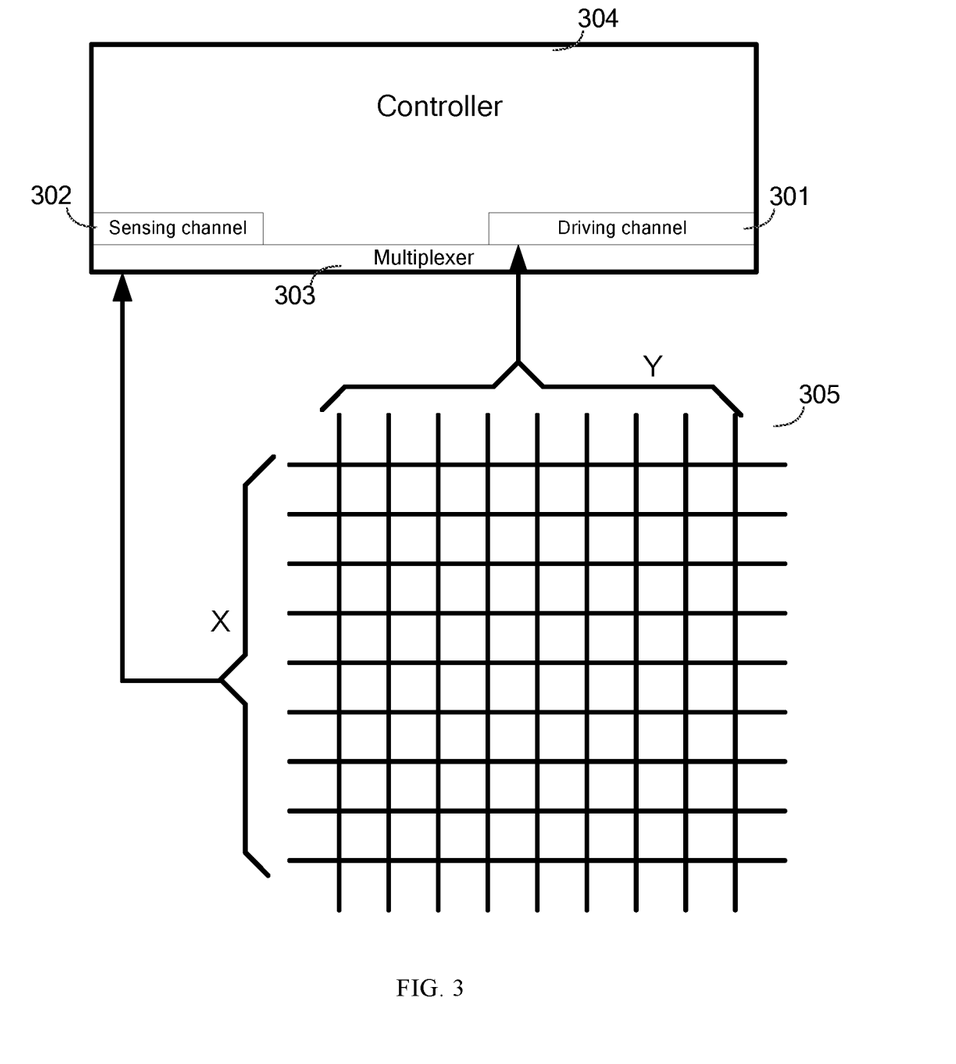
FIG. 3 is a schematic structural diagram of a circuit according to an embodiment of the present disclosure.

The technical solution disclosed in Embodiment 1 can be applied to the capacitance table in the practical case as illustrated in FIG. 3. In FIG. 3, the case where the coupling capacitor is a mutual-capacitor is used as an example, that is, the capacitor array network is a mutual-capacitor array network. The capacitor array network includes a driving channel 301, a sensing channel 302, a multiplexer 303, a controller 304 and a mutual-capacitor array network 305. The driving channel 301 is configured to provide a driving signal to the coupling capacitor. The sensing channel 302 is configured to receive an output signal from the coupling capacitor. The multiplexer 303 is configured to enable a plurality of coupling capacitor to multiplex the same driving channel 301 or the same sensing channel 302. The controller 304 is configured to acquire feature data output by each coupling capacitor in the capacitor array network when the coupling capacitor is touched, and reference feature data corresponding to each coupling capacitor; and determine a feature region formed by touch on the capacitor array according to the feature data output by each coupling capacitor and the corresponding reference feature data, to determine a hand holding state according to the feature region.

Detailed description of the controller 304 may be referenced to the related disclosure of the processor in the above embodiments, which is not given herein any further.

Figure 4:
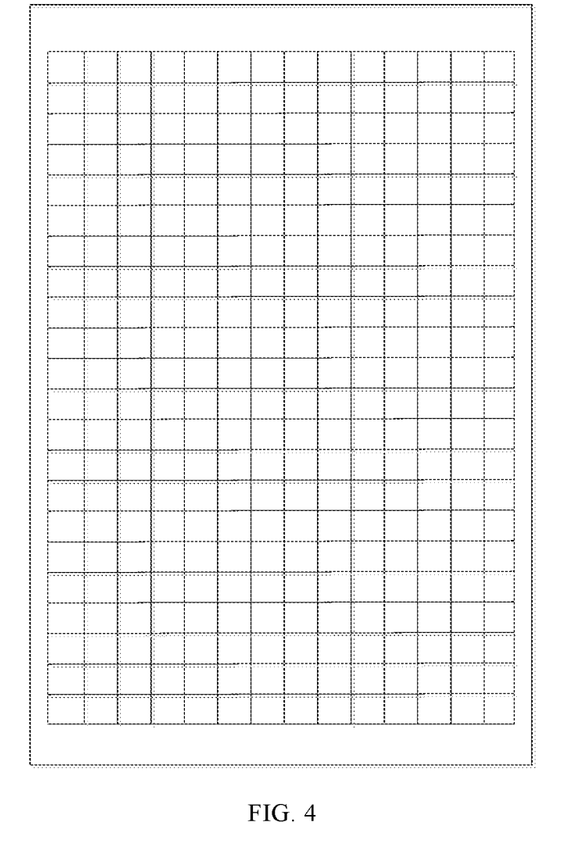
FIG. 4 is a schematic planar diagram of a touch screen.
Figure 5:
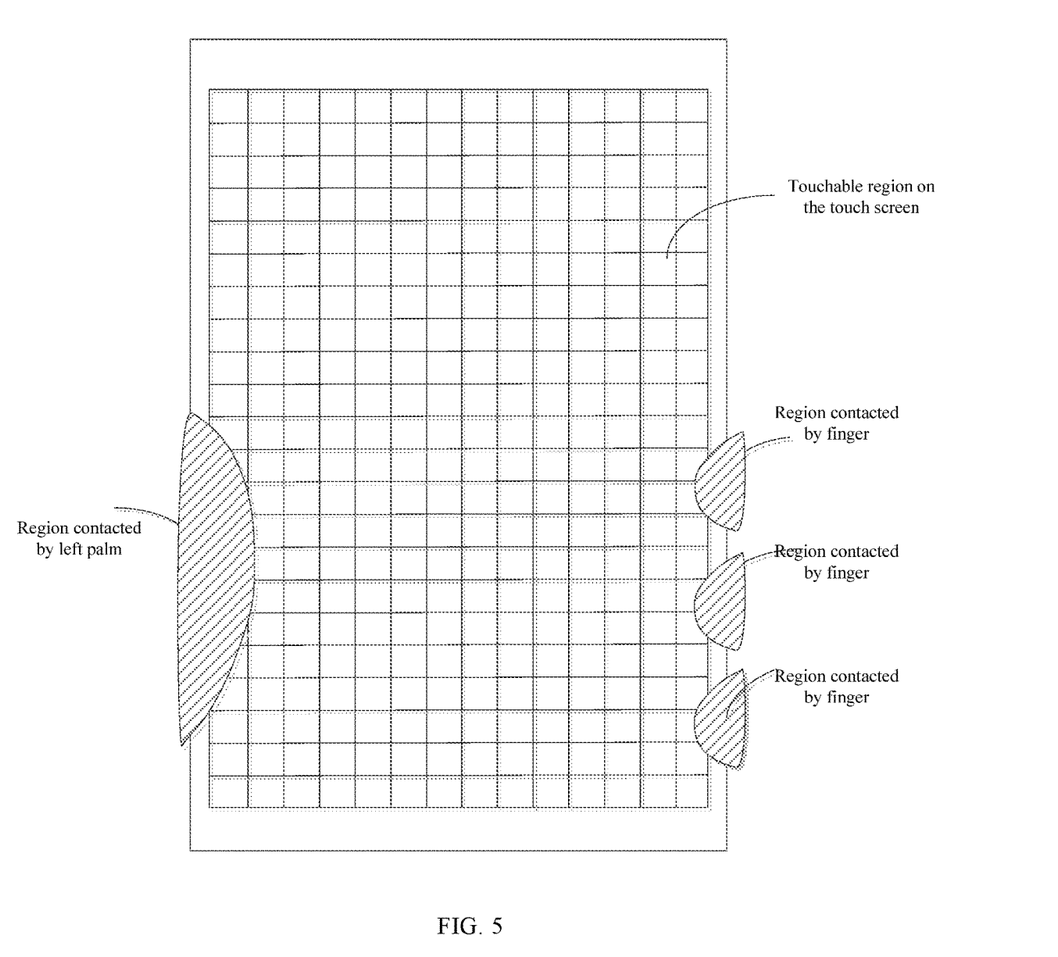
FIG. 5 is a schematic diagram illustrating holding the touch screen by the left hand.
Figure 6:
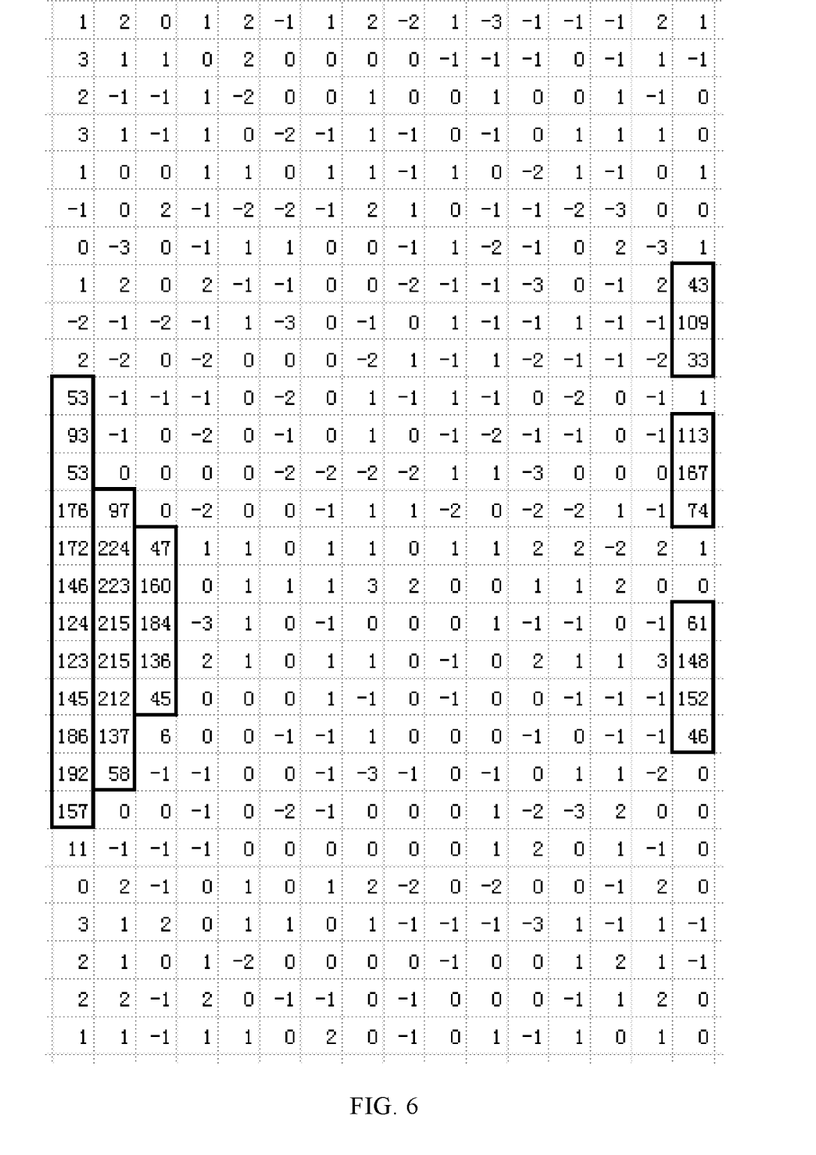
FIG. 6 is a schematic diagram of mutual-capacitance differences when a coupling capacitor is a mutual capacitor in a left-hand holding state.

FIG. 4 is a schematic planar diagram of a touch screen, and in FIG. 4 each square denotes a coupling capacitor. FIG. 5 is a schematic diagram illustrating holding the touch screen by the left hand. As illustrated in FIG. 5, on the left side, a palm is in contact with the touch screen, and on the right side, three fingers are in contact with the touch screen. FIG. 6 is a schematic diagram of mutual-capacitance differences when a coupling capacitor is a mutual capacitor in a left-hand holding state.

Figure 7:
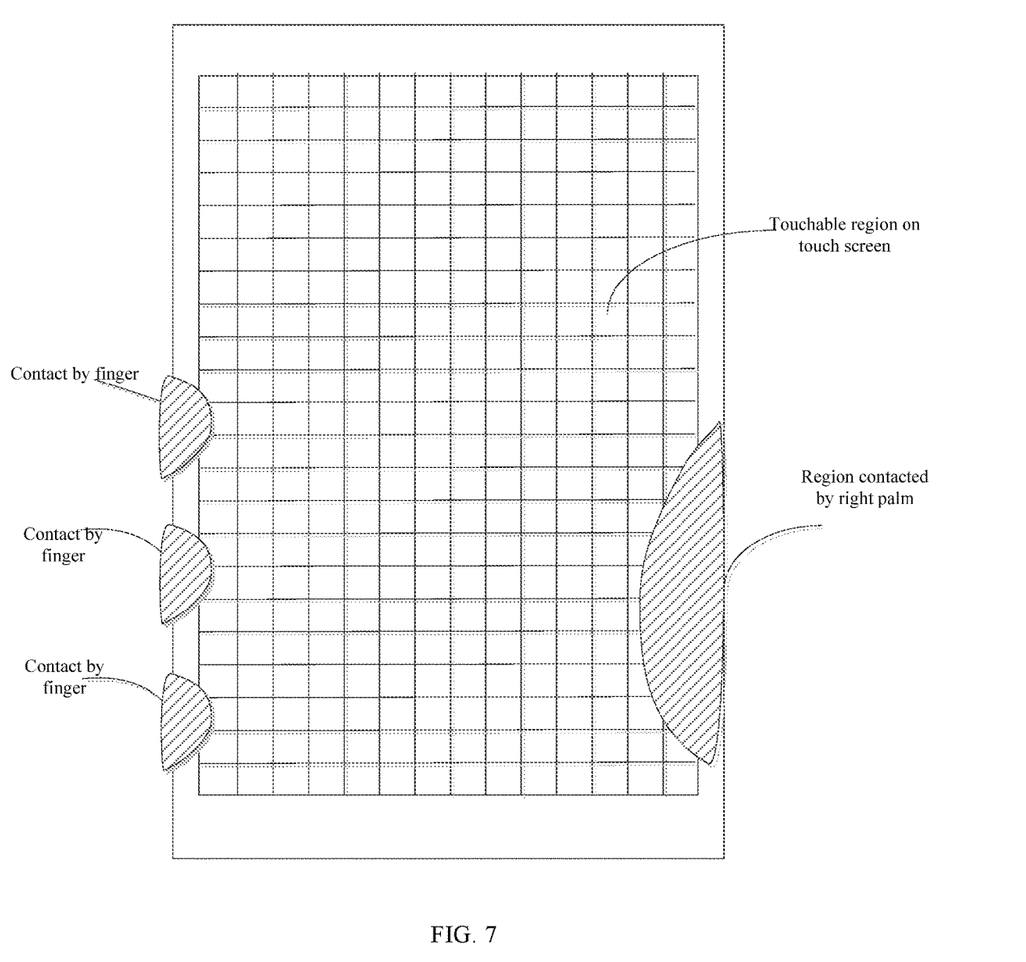
FIG. 7 is a schematic diagram illustrating holding the touch screen by the right hand.
Figure 8:
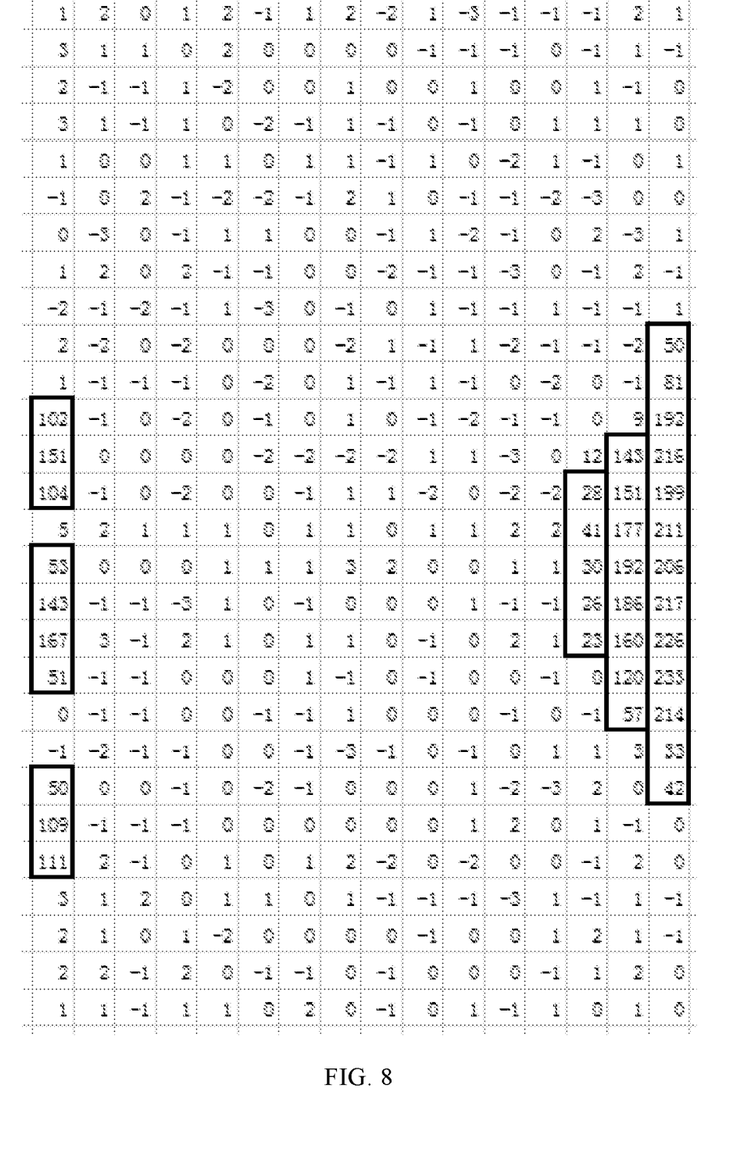
FIG. 8 is a schematic diagram of mutual-capacitance differences when a coupling capacitor is a mutual capacitor in a right-hand holding state.

FIG. 7 is a schematic diagram illustrating holding the touch screen by the right hand. As illustrated in FIG. 7, on the right side, a palm is in contact with the touch screen, and on the left side, three fingers are in contact with the touch screen. FIG. 8 is a schematic diagram of mutual-capacitance differences when a coupling capacitor is a mutual capacitor in a right-hand holding state.

Referring to FIG. 4 to FIG. 8, in this embodiment, since an independent feature region is formed by a touch by each finger, the determining a hand holding state according to the feature region includes: if there is only one feature region and this feature region corresponds to feature data starting from a left side, determining that the hand holding state is left-hand holding; and if there is only one independent feature region and this independent feature region corresponds feature data starting from a right side, determining that the hand holding state is right-hand holding. Further, the determining a hand holding state according to the feature region may include: calculating the number of feature regions; if there is only one feature region and this feature region corresponding the feature data starting from the left side and is a triangle shape, determining that the hand holding state is left-hand holding; and if there is only one feature region and this feature region corresponding to the feature data starting from the right side and is a triangle shape, determining that the hand holding state is right-hand holding.

Alternatively, the determining a hand holding state according to the feature region may include: if there are a plurality of independent feature regions and the plurality of independent feature regions are independent of each other and correspond to feature data starting from a right side, determining that the hand holding state is left-hand holding; and if there are a plurality of independent feature regions and the plurality of independent feature regions are independent of each other and correspond to feature data starting from a left side, determining that the hand holding state is right-hand holding.

In other embodiments, whether the hand holding state is left-hand holding or right-hand holding may be judged by identifying whether a single triangle feature region and a plurality of independent feature regions correspond to the real-time feature data starting from the left side or the right side.

Figure 9:
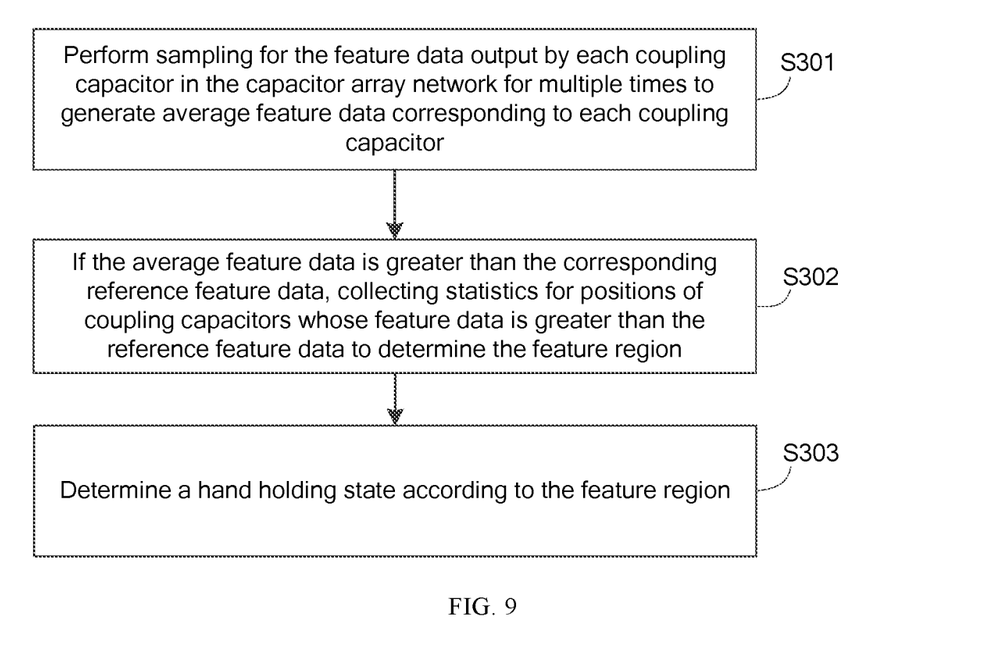
FIG. 9 is a schematic flowchart of a hand holding state detection method according to Embodiment 3 of the present disclosure.

FIG. 9 is a schematic flowchart of a hand holding state detection method according to Embodiment 3 of the present disclosure. As illustrated in FIG. 9, different from the above embodiment, in this embodiment, sampling is performed for each coupling capacitor for multiple times, and an average value calculation is performed for feature data sampled for multiple times to obtain corresponding average feature data. Therefore, the method according to this embodiment may include the following steps:

S301: Sampling is performed for the feature data output by each coupling capacitor in the capacitor array network for multiple times to generate average feature data corresponding to each coupling capacitor.

Different from the above embodiment, in this embodiment, sampling is performed for multiple times for the feature data output by each coupling capacitor to obtain the average feature data, thereby improving accuracy.

S302: If the average feature data is greater than the corresponding reference feature data, statistical collection is performed for positions of coupling capacitors whose average feature data is greater than the reference feature data to determine the feature region.

In this embodiment, the reference feature data is the same as that in the above embodiment, which is not described herein any further. In addition, the statistical collection technique used when the average feature data is greater than the reference feature data is similar to those in the above embodiment.

S303: A hand holding state is determined according to the feature region.

Figure 10:
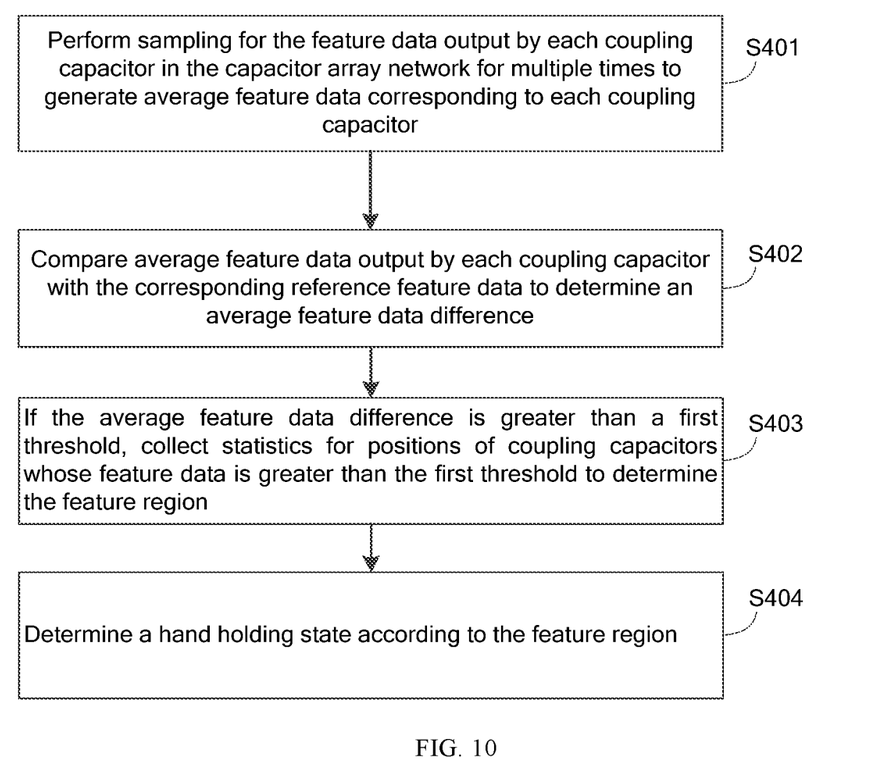
FIG. 10 is a schematic flowchart of a hand holding state detection method according to Embodiment 4 of the present disclosure.

FIG. 10 is a schematic flowchart of a hand holding state detection method according to Embodiment 4 of the present disclosure. Different from the above embodiments, in this embodiment, a feature region is determined based on an average feature data difference. Specifically, the method may include the following steps:

S401: Sampling is performed for the feature data output by each coupling capacitor in the capacitor array network for multiple times to generate average feature data corresponding to each coupling capacitor.

S402: Average feature data output by each coupling capacitor is compared with the corresponding reference feature data to determine an average feature data difference.

S403: If the average feature data difference is greater than a first threshold, statistical collection is performed for positions of coupling capacitors whose feature data difference is greater than the first threshold to determine the feature region.

In this embodiment, related description of the first threshold may be referenced to the related disclosure in the above embodiment, which is not given herein any further.

Different from the above embodiment, in this embodiment, the average feature data difference is compared with the first threshold to determine the feature region.

S404: A hand holding state is determined according to the feature region.

Specifically, in this embodiment, the determining a hand holding state according to the feature region includes: performing statistical counting for variation degree of the average feature data output by different coupling capacitors whose average feature data is greater than the first threshold, and determining the hand holding state according to the variation degree. Optionally, statistical collection is performed for the variation degree of the feature data according to variance or differential calculation.

Specifically, the determining a hand holding state according to the feature region includes: if there is only one feature region and this feature region corresponds to feature data starting from a left side, determining that the hand holding state is left-hand holding; and if there is only one independent feature region and this independent feature region corresponds feature data starting from a right side, determining that the hand holding state is right-hand holding. Specifically, the determining a hand holding state according to the feature region may include: calculating the number of feature regions; if there is only one feature region and this feature region corresponding the feature data starting from the left side and is a triangle shape, determining that the hand holding state is left-hand holding; and if there is only one feature region and this feature region corresponding to the feature data starting from the right side and is a triangle shape, determining that the hand holding state is right-hand holding.

Alternatively, the determining a hand holding state according to the feature region may include: if there are a plurality of independent feature regions and the plurality of independent feature regions are independent of each other and correspond to feature data starting from a right side, determining that the hand holding state is left-hand holding; and if there are a plurality of independent feature regions and the plurality of independent feature regions are independent of each other and correspond to feature data starting from a left side, determining that the hand holding state is right-hand holding.

Figure 11:
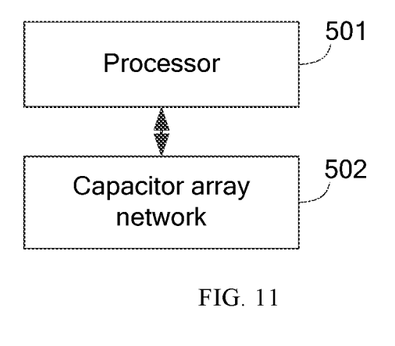
FIG. 11 is a schematic structural diagram of a capacitive touch apparatus according to Embodiment 5 of the present disclosure.

FIG. 11 is a schematic structural diagram of a capacitive touch apparatus according to Embodiment 5 of the present disclosure. As illustrated in FIG. 11, the apparatus includes: a processor 501 and a capacitor array network 502. The processor 501 is configured to acquire feature data output by each coupling capacitor in a capacitor array network when the coupling capacitor is touched, and reference feature data corresponding to each coupling capacitor; and determine a feature region formed by touch on the capacitor array according to the feature data output by each coupling capacitor and the corresponding reference feature data, to determine a hand holding state according to the feature region.

Specifically, in an embodiment of the present disclosure, the processor 501 is further configured to: compare the feature data output by each coupling capacitor with the corresponding reference feature data; and if a value of the feature data is greater than a value of the corresponding reference feature data, determine positions of coupling capacitors whose feature data is greater than the reference feature data to determine the feature region.

Alternatively, in an embodiment of the present disclosure, the processor 501 is further configured to: compare a value of the feature data output by each coupling capacitor with a value of the corresponding reference feature data to determine a feature data difference; if the feature data difference is greater than a first threshold, determine positions of coupling capacitors whose feature data difference is greater than the first threshold to determine the feature region.

Specifically, in an embodiment of the present disclosure, the processor 501 is further configured to perform statistical counting for variation degree of the feature data output by different coupling capacitors whose feature data difference is greater than the first threshold, and determine the hand holding state according to the variation degree. The processor is further configured to perform statistical counting for the variation degree of the feature data according to variance or differential calculation.

Alternatively, in an embodiment of the present disclosure, the processor 501 is further configured to: perform sampling for the feature data output by each coupling capacitor in the capacitor array network for multiple times to generate average feature data corresponding to each coupling capacitor; and if the average feature data is greater than the corresponding reference feature data, perform statistical counting for positions of coupling capacitors whose feature data is greater than the reference feature data to determine the feature region.

Alternatively, in an embodiment of the present disclosure, the processor 501 is further configured to: compare average feature data output by each coupling capacitor with the corresponding reference feature data to determine an average feature data difference; and if the average feature data difference is greater than a first threshold, perform statistical counting for positions of coupling capacitors whose feature data difference is greater than the first threshold to determine the feature region. Specifically, in an embodiment of the present disclosure, the processor 501 is further configured to perform statistical counting for variation degree of the average feature data output by different coupling capacitors whose average feature data difference is greater than the first threshold, and determine the hand holding state according to the variation degree. Specifically, the processor is further configured to perform statistical counting for the variation degree of the average feature data according to variance or differential calculation.

Specifically, in an embodiment of the present disclosure, the processor 501 is further configured to: if there is only one feature region and this feature region corresponds to feature data starting from a left side, determine that the hand holding state is left-hand holding; and if there is only one independent feature region and this independent feature region corresponds feature data starting from a right side, determine that the hand holding state is right-hand holding.

Alternatively, in an embodiment of the present disclosure, the processor 501 is further configured to: if there are a plurality of independent feature regions and the plurality of independent feature regions are independent of each other and correspond to feature data starting from a right side, determine that the hand holding state is left-hand holding; and if there are a plurality of independent feature regions and the plurality of independent feature regions are independent of each other and correspond to feature data starting from a left side, determine that the hand holding state is right-hand holding.

Further, in an embodiment of the present disclosure, the processor 501 is further configured to: calculate the number of feature regions; if there is only one feature region and this feature region corresponding the feature data starting from the left side and is a triangle shape, determine that the hand holding state is left-hand holding; and if there is only one feature region and this feature region corresponding to the feature data starting from the right side and is a triangle shape, determine that the hand holding state is right-hand holding.

In the above embodiments, the capacitor array network is a self-capacitor array network, and the coupling capacitor is a self-capacitor; or the capacitor array network is a mutual-capacitor array network, and the coupling capacitor is a mutual-capacitor.

The apparatus according to the embodiments of the present application may be practiced by a computer program. A person skilled in the art should understand the above division of units and modules is only an exemplary one, and if the apparatus is divided into other units or modules or not divided, the technical solution shall also fall within the protection scope of the present application as long as the information object has the above functions.

A person skilled in the art shall understand that the embodiments of the present application may be described to illustrate methods, apparatuses (devices), or computer program products. Therefore, hardware embodiments, software embodiments, or hardware-plus-software embodiments may be used to illustrate the present application. In addition, the present application may further employ a computer program product which may be implemented by at least one non-transitory computer-readable storage medium with an executable program code stored thereon. The non-transitory computer-readable storage medium comprises but not limited to a disk memory, a CD-ROM, and an optical memory.

The present disclosure is described based on the flowcharts and/or block diagrams of the method, apparatus (device), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a non-transitory computer-readable memory capable of causing a computer or other programmable data processing devices to work in a specific mode, such that the instructions stored on the non-transitory computer-readable memory implement a product comprising an instruction apparatus, where the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

Although the preferred embodiments of the present application are described above, once knowing the basic creative concept, a person skilled in the art can make other modifications and variations to these embodiments. Therefore, the appended claims are intended to be construed as covering the preferred embodiments and all the modifications and variations falling within the scope of the present application. Obviously, a person skilled in the art can make various modifications and variations to the present application without departing from the spirit and scope of the present application. In this way, the present application is intended to cover the modifications and variations if they fall within the scope of the appended claims of the present application and equivalent technologies thereof.

What is claimed is:

1. A hand holding state detection method, comprising:
    acquiring feature data output by each coupling capacitor in a capacitor array when the coupling capacitor is touched;
    acquiring reference feature data corresponding to each coupling capacitor;
    comparing the feature data output by each coupling capacitor with the corresponding reference feature data to obtain a feature data difference, determining a feature region based on position of a coupling capacitor whose feature data difference is greater than a first threshold;
    performing statistical counting for determining variation degree of the feature data output by different coupling capacitors in the feature region, wherein the statistical counting is performed according to variance or differential calculation of the feature data output by the different coupling capacitors in the feature region; and
    determining a hand holding state is a finger holding state when the variation degree is greater than a second threshold: and determining the hand holding state is a palm holding state when the variation degree is less than a third threshold.

2. The method according to claim 1, wherein:
    the determining a feature region formed by touch on the capacitor array by comparing the feature data output by each coupling capacitor with the corresponding reference feature data to obtain a feature data difference, position of a coupling capacitor whose feature data difference is greater than a first threshold is used to determine the feature region comprises:
    performing sampling for the feature data output by each coupling capacitor for multiple times to generate average feature data corresponding to each coupling capacitor; and
    comparing average feature data output by each coupling capacitor with the corresponding reference feature data to determine an average feature data difference; and if the average feature data difference is greater than the first threshold, performing statistical counting for positions of coupling capacitors whose feature data is greater than the first threshold to determine the feature region.

3. The method according to claim 1, wherein the determining the hand holding state according to the feature region comprises:
    if there is only one feature region and the feature region corresponds to feature data starting from a left side, determining that the hand holding state is left-hand holding; and if there is only one independent feature region and the independent feature region corresponds feature data starting from a right side, determining that the hand holding state is right-hand holding; or
    if there are a plurality of independent feature regions and the plurality of independent feature regions are independent of each other and correspond to feature data starting from a right side, determining that the hand holding state is left-hand holding; and if there are a plurality of independent feature regions and the plurality of independent feature regions are independent of each other and correspond to feature data starting from a left side, determining that the hand holding state is right-hand holding; or
    calculating the number of feature regions; if there is only one feature region and the feature region corresponding the feature data starting from the left side and is a triangle shape, determining that the hand holding state is left-hand holding; and if there is only one feature region and the feature region corresponding to the feature data starting from the right side and is a triangle shape, determining that the hand holding state is right-hand holding.

4. The method according to claim 1, wherein the capacitor array is a self-capacitor array, and the coupling capacitor is a self-capacitor; or the capacitor array is a mutual-capacitor array, and the coupling capacitor is a mutual-capacitor.

5. A capacitive touch apparatus, comprising: a processor connected to a capacitor array; wherein the processor is configured to:
    acquire feature data output by each coupling capacitor in the capacitor array when the coupling capacitor is touched, and reference feature data corresponding to each coupling capacitor;
    determine a feature region formed by touch on the capacitor array by comparing the feature data output by each coupling capacitor with the corresponding reference feature data to obtain a feature data difference, position of a coupling capacitor whose feature data difference is greater than a first threshold is used to determine the feature region;
    perform statistical counting to determine variation degree of the feature data output by different coupling capacitors in the feature region, wherein the statistical counting is performed according to variance or differential calculation among the feature data output by the different coupling capacitors in the feature region; and
    determine a hand holding state is a finger holding state when the variation degree is greater than a second threshold: and determining the hand holding state is a palm holding state when the variation degree is less than a third threshold.

6. The apparatus according to claim 5, wherein:
    the processor is further configured to:
    perform sampling for the feature data output by each coupling capacitor for multiple times to generate average feature data corresponding to each coupling capacitor; and
    compare average feature data output by each coupling capacitor with the corresponding reference feature data to determine an average feature data difference, if the average feature data difference is greater than the first threshold, perform statistical counting for positions of coupling capacitors whose feature data is greater than the first threshold to determine the feature region.

7. The apparatus according to claim 5, wherein the processor is further configured to:
    if there is only one feature region and the feature region corresponds to feature data starting from a left side, determine that the hand holding state is left-hand holding; and if there is only one independent feature region and the independent feature region corresponds feature data starting from a right side, determine that the hand holding state is right-hand holding; or
    if there are a plurality of independent feature regions and the plurality of independent feature regions are independent of each other and correspond to feature data starting from a right side, determine that the hand holding state is left-hand holding; and if there are a plurality of independent feature regions and the plurality of independent feature regions are independent of each other and correspond to feature data starting from a right side, determine that the hand holding state is right-hand holding; or calculate the number of feature regions; if there is only one feature region and the feature region corresponding the feature data starting from the left side and is a triangle shape, determine that the hand holding state is left-hand holding; and if there is only one feature region and the feature region corresponding to the feature data starting from the right side and is a triangle shape, determine that the hand holding state is right-hand holding.

8. The apparatus according to claim 5, wherein the capacitor array is a self-capacitor array, and the coupling capacitor is a self-capacitor; or the capacitor array is a mutual-capacitor array, and the coupling capacitor is a mutual-capacitor.

9. An electronic device, comprising a processor and a capacitor array connected to the processor; wherein the processor is configured to:
  acquire feature data output by each coupling capacitor in the capacitor array when the coupling capacitor is touched, and reference feature data corresponding to each coupling capacitor;
  determine a feature region formed by touch on the capacitor array by comparing the feature data output by each coupling capacitor with the corresponding reference feature data to obtain a feature data difference, position of a coupling capacitor whose feature data difference is greater than a first threshold is used to determine the feature region:
  perform statistical counting to determine variation degree of the feature data output by different coupling capacitors in the feature region, wherein the statistical counting is performed according to variance or differential calculation among the feature data output by the different coupling capacitors in the feature region; and
  determine a hand holding state is a finger holding state when the variation degree is greater than a second threshold; and determining the hand holding state is a palm holding state when the variation degree is less than a third threshold.

* * * * *